United States Patent [19]
Wickman

[11] Patent Number: 4,607,170
[45] Date of Patent: Aug. 19, 1986

[54] DATA COMMUNICATION INTERCONNECT DEVICE
[75] Inventor: Miles X. Wickman, Edgewater, Md.
[73] Assignee: Digitel, Inc., Edgewater, Md.
[21] Appl. No.: 707,456
[22] Filed: Mar. 1, 1985
[51] Int. Cl.$^4$ .......................... H01B 7/30; H04B 3/00; H01R 13/46
[52] U.S. Cl. ...................................... 307/147; 375/36; 339/147 P
[58] Field of Search ..................... 307/147, 89; 375/36, 375/37, 38; 339/147 P

[56] References Cited
U.S. PATENT DOCUMENTS
4,481,426 11/1984 Nakagawa et al. ............... 307/91
FOREIGN PATENT DOCUMENTS
2119206 11/1983 United Kingdom .

Primary Examiner—William M. Shoop, Jr.
Assistant Examiner—Alfred Hoyte
Attorney, Agent, or Firm—Lowe, Price, LeBlanc, Becker & Shur

[57] ABSTRACT

A unitary interconnection device for interconnecting digital data handling equipment which comprises an RS-232C type interface that includes a pair of pin connectors having a housing and multiple pins and a multiple conductor cable interconnecting the pins in the connectors, and an active signal circuit enclosed within the housing of one of the connectors and connected to pins in the connectors, wherein the signal circuit includes means for generating a time or clock signal for timing or clocking the flow of data signals through the interconnection device and a diode-capacitor network for providing power to the timing or clock signal generating means.

7 Claims, 2 Drawing Figures

DATA COMMUNICATION INTERCONNECT DEVICE

BACKGROUND OF THE INVENTION

The present invention relates to a data transmission device for transmitting data between microprocessors and/or computers and related equipment and more particularly relates to an interface between data communications equipment (DCE) and data terminal equipment (DTE).

The DTE-DCE interface which is currently most commonly in use to interconnect I/O ports in serial communications systems in the United States conforms to the RS-232C standard as published by the Electronics Industry Association (EIA). The interface is commonly referred to as the EIA RS-232C interface or simply as the RS-232C interface. Because of the nature of the RS-232C interface there are practical limits to the distance over which it may be used without requiring additional equipment. For example, at 110 baud, RS-232C transmissions are generally limited to approximately 1000 feet. At 9600 baud, they are generally limited to 50 feet. Under the EIA standard the recommended maximum cable length is 50 feet.

The RS-232C and the like standards are intended to define the interface between DTE's and DCE's for communications over networks, usually telephone facilities. They actually do not directly address the use of the interface as a general serial I/O port nor the connecting of peripheral devices such as printers to DTE's such as computers. Nevertheless this type of usage of the RS-232C interface is common and the foregoing distance limitations generally present no serious problems since typical connections are frequently 15 feet or shorter. On the other hand occasions frequently arise when it is desired to transmit data communications over longer distances at the same site without utilizing telephone lines or the like.

At the present time it is common practice to cope with this problem through the use of devices which are commonly known as modem eliminators. Generally speaking these devices constitute autonomous self-contained A.C. line powered units which interconnect computers and/or microprocessor ports to a terminal within the parameters of EIA Specification RS-232C. The units usually provide operation at multiple bps speeds which are switch selectable. While modem eliminators of this type are generally effective for their intended purposes they are relatively expensive and involve the use of additional separately housed equipment connected to the A.C. power mains.

SUMMARY OF THE INVENTION

It is an object of the present invention to provide an improved data communications interconnect or interface of the RS-232C or the like type which is inexpensive and which requires no separately housed equipment or separate power supply.

It is another object of the invention to provide an RS-232C or the like interface comprised of standard connectors and interconnecting cable which is capable of maintaining data communications over distances greater than those which are practically feasible with standard EIA Rs-232C cable interfaces.

It is another object of the present invention to provide an improved data communications transmission device for interconnecting DTE and DCE and the like units utilizing only a standard connector terminated cable which requires no separately housed equipment nor power supply derived from the A.C. power mains.

It is still another object of the invention to provide an interconnecting device of the foregoing type which incorporates and supplies its own timing device or clock.

It is another object of the invention to provide a unitary interconnection device for interconnecting digital data handling equipment which comprises an RS-232C type interface that includes a pair of pin connectors having a housing and multiple pins and a multiple conductor cable interconnecting the pins in the connectors, and an active signal circuit enclosed within the housing of one of the connectors and connected to pins in the connectors, wherein the signal circuit includes means for generating a time or clock signal for timing or clocking the flow of data signals through the interconnection device and a diode-capacitor network for providing power to the timing or clock signal generating means.

According to the invention a type RS-232C cable interface is modified to create a unique new interconnect which may be used as a general serial I/O port interface for microprocessors and computers and the like on the one hand and peripheral devices of varying types on the other hand. The new interface is capable of interconnecting equipment over distances greater than that which is practical with a standard RS-232C interface. According to the invention there is incorporated both physically and electronically into an RS-232C type interface a subasssembly which is of such small physical size as to be subject to incorporation into a standard DB-25 connector housing. The subassembly includes a low power CMOS timer operating as an astable multivibrator to provide timing or clock signals for the interface. The assembly also includes a diode-capacitor network which provides supply voltage for the timer-clock and associated circuitry with such power being derived from the signals available at the I/O ports of the interconnected equipment. The result is a relatively low cost interface device which has the appearance and size and convenience of a standard RS-232C interface but which is capable of operating over significantly longer distances.

The foregoing and other objects and advantages of the present invention will become more apparent upon reference to the following specification, claims and drawings.

DESCRIPTION OF PREFERRED EMBODIMENT

Figure 1:
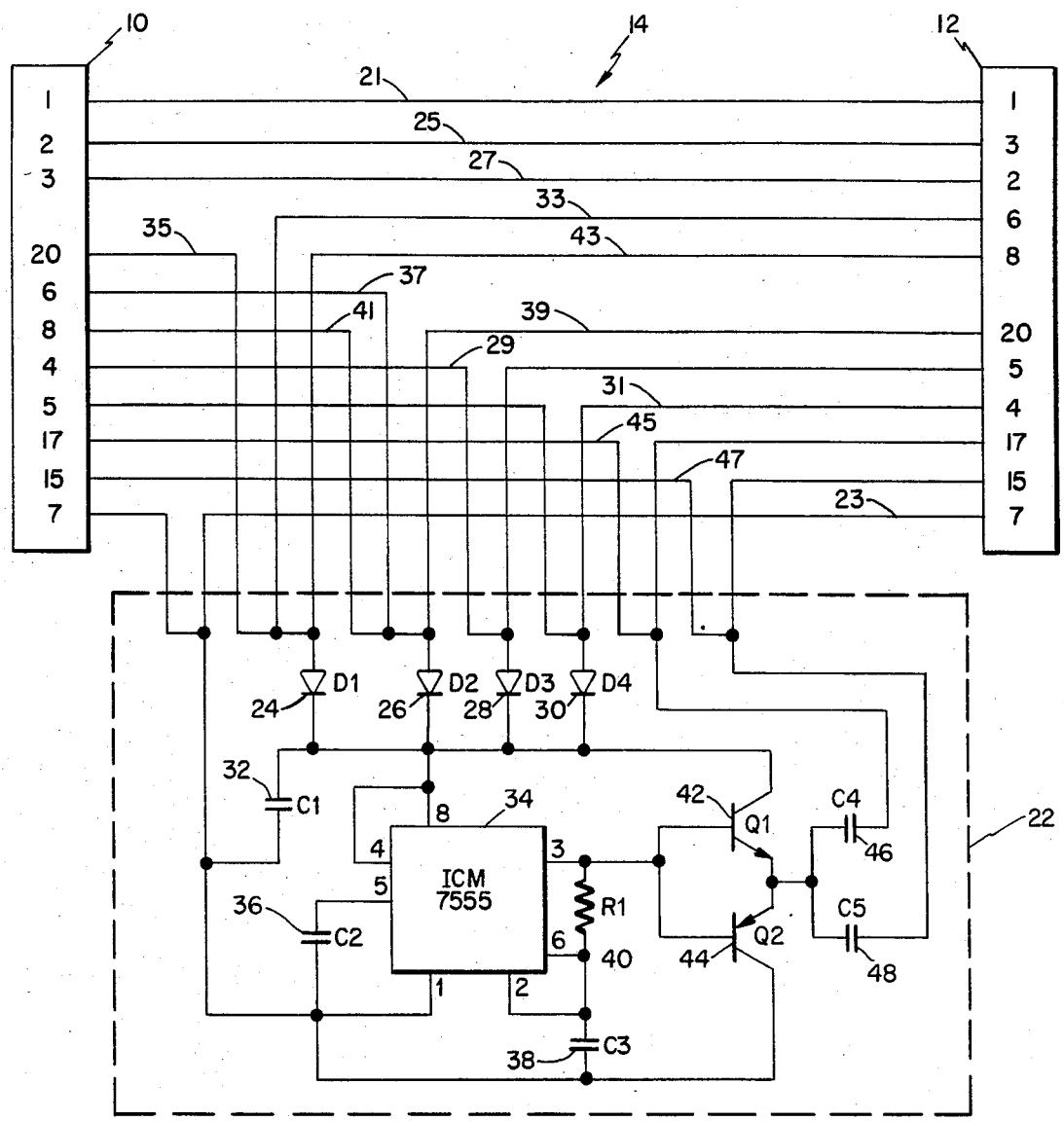
FIG. 1 is a circuit diagram of a preferred embodiment of the data transmission device of the present invenion.

Referring to FIG. 1 there is shown in diagramatic form an RS-232C type interface which has been modified to incorporate and constitute the data transmission device of the present invention. A female connector of a type suitable for use with the I/O ports of data processors and related equipment, for example a DB-25 connector, is shown diagrammatically at 10. The female connector 10 is connected to a male connector such as a DB-25 shown diagramatically at 12 by a suitable multiconductor cable shown at 14.

The connection between the DTE and the DCE apparatus includes a number of separate wires carrying signals between the two pieces of equipment. These are the data signals and the control signals necessary for developing and controlling the information transmitted along the lines. Some of these wires are shown in FIG. 1. Individual wires in the RS-232C cable 14 are connected to pins 1, 2, 3, 4, 5, 6, 7, 8, 15, 17 and 20 of the connectors 10 and 12 as indicated by the reference and pin numerals shown in the diagramatic illustrations of the connectors 10 and 12 in FIG. 1. As is conventional the female DB-25 connector 10 is adapted to be connected to the DCE (the microcomputer) and the male DB-25 is adapted to be connected to the DTE (the terminal). The pins are assigned as in the RS-232C Standard wherein all signal names are as viewed from the DTE.

Pin 1 is the protective ground intended to connect the frames or chassis of the two pieces of equipment and these two pins in connectors 10 and 12 are connected by wire 21. Pin 7 is the reference signal ground for all of the other pins. These two pins in connectors 10 and 12 are connected by wire 23. The DTE transmits data on pin 2 and receives on pin 3. The DCE transmits data on pin 3 and receives on pin 2 and these pins are accordingly transposed in the connections made by wires 25 and 27 shown in FIG. 1. The DTE asserts the Request to Send on pin 4 when it has data to transmit and this is received by pin 5 of the DCE. The DCE then asserts Clear to Send on its pin 4 which is received on the DTE pin 5. These connections are made by wires 29 and 31 in FIG. 1. The DTE asserts its Data Terminal Ready signal on pin 20 and this is received by the DCE on pin 6. The DCE asserts its Data Set Ready signal on pin 20 and this is received by the DTE on its pin 6. These connections are made by wires 33 and 35, 37 and 39 in FIG. 1. The DTE pin 8 is usually called Data Carrier Detect. In the absence of a modem such as in the situation in FIG. 1 pin 8 is tied to pin 20 by wires 41 and 43. Pins 15 and 17 of the DTE and DCE are timing connections and are connected to one another in FIG. 1 by wires 45 and 47.

According to the invention the data transmission device illustrated in FIG. 1 is provided with a power and timer/driver or clock subassembly indicated at 22. This subassembly may be provided on a PC card or circuit board of small size as will presently be described.

Referring to the subassembly 22 in FIG. 1, a first diode D1 shown at 24 has its anode connected to the female connector pin 20 and to the male connector pins 6 and 8. Diode D2 indicated at 26 has its anode connected to female pins 6 and 8 and to male connector pin 20. Diode D3 indicated at 28 has its anode connected to female connector pin 4 and to male connector pin 5. Diode D4 indicated at 30 has its anode connected to female connector 5 and to male pin 4. The cathodes of the diodes D1, D2, D3 and D4 are all connected to capacitor C1 indicated at 32 which has its other terminal grounded to the signal ground common return pin 7 on both the female and male connectors. The positive signal peak voltages are captured by the diode-capacitor network and the capacitor C1 supplies positive voltage to the subassembly for the time duration between peak voltages.

A type 7555 integrated circuit timer as indicated at 34 has its positive pin 8 connected to the junction of the cathodes of the diodes D1, D2, D3 and D4 and the positive side of the capacitor C1. The 7555 timer is a CMOS low power version of the IC 555 and is available as an 8 pin mini-DIP which is readily mounted on a very small PC card or circuit board. The 7555 timer 34 is connected at its pins 1 and 5 to capacitor C2 shown at 36 and at its pins 2 and 6 to grounded capacitor C3 indicated at 38. Resistor R1 indicated at 40 is connected between pins 3 and 6. Pin 3 is the output and controls a driver flip-flop comprised of bipolar transistors Q1 and Q2 indicated at 42 and 44. The diodes, capacitors, resistor and transistors are mounted on the small PC card or circuit board with the IC to provide a small subassembly.

The 7555 timer 34 is connected as an astable multivibrator or square wave clock as shown in FIG. 1 and this provides timing clock signals via capacitors C4 and C5 indicated at 46 and 48 to pins 17 and 15 of the female and male connectors 10 and 12. The subassembly 22 in FIG. 1 thus constitutes a self-powered timer-clock for the data transmission device of the invention. The connector illustrated in FIG. 1 and described in relation thereto provides a DTE-DCE interface which is usable over distances considerably in excess of those which are practical with a standard EIA RS-232C interface.

Figure 2:
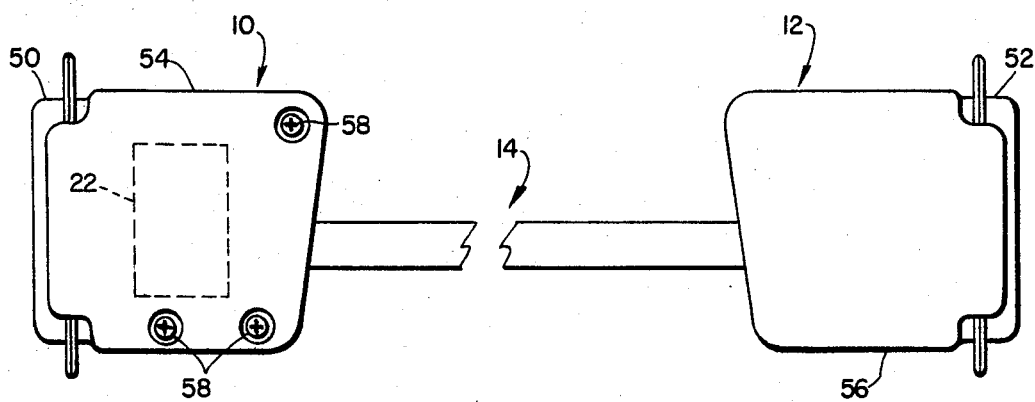
FIG. 2 is a side elevation of a typical data transmission device of the present invention.

Referring to FIG. 2 the female and male connectors 10 and 12 and interconnecting cable 14 are shown in side elevation. These connectors may comprise DB-25 connectors of the type available for example from AMP Incorporated as HDP 20 metal shell connectors indicated at 50 and 52 in FIG. 2. These are received and held in conventional plastic cases indicated at 54 and 56 which may be fastened in the conventional manner by screws indicated at 58. Such plastic connector cases are also available from AMP Incorporated by way of example. The PC card or circuit board carrying the timing or clock and power supply circuitry illustrated at 22 in FIG. 1 is sufficiently small to be carried within the space available in the plastic housing 54 of the female connector 10 as indicated in phantom at 22 in FIG. 2.

It will be appreciated that the interconnect or interface of the present invention is of substantially the same size as the conventional RS-232C interface. However the device of the invention may be utilized over much longer distances than RS-232C interfaces to connect relatively remote peripheral devices such as printers to DTE's such as computers and the like. The interface of the invention may be provided at a cost considerably lower than the cost of a modem simulator. The interconnect or interface of the invention may be provided in a number of predetermined clock speeds as may be selected by the purchaser.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

I claim:

1. A unitary interconnection device for interconnecting digital data handling equipment comprising a pair of connectors each having multiple terminal connection means, a multiple conductor cable connecting said connectors, and an active signal circuit connected to said terminal connection means, said active signal circuit including means for generating a timer or clock signals for timing or clocking the flow of data signals through said interconnection device and a diode-capacitor network for providing power to said timing or clock signal generating means.

2. A unitary interconnection device according to claim 1 wherein said connectors include housings and said active signal circuit is incorporated within one of said connector housings.

3. A unitary interconnection device according to claim 1 or claim 2 wherein said active signal circuit includes a CMOS astable multivibrator controlling bipolar transistor drivers to provide said timer or clock signals.

4. A unitary interconnection device for interconnecting digital data handling equipment comprising an RS-232C type interface which includes a pair of pin connectors each having multiple pins and a housing, a multiple conductor cable interconnecting pins in said connectors, and an active signal circuit enclosed within the housing of one of said connectors and connected to pins in said connectors, said active signal circuit including means for generating a time or clock signal for timing or clocking the flow of data signals through said interconnection device and a diode-capacitor network for providing power to said timing or clock signal generating means.

5. A unitary interconnection device according to claim 4 wherein said active signal circuit includes a CMOS astable multivibrator controlling bipolar transistor drivers to provide said time or clock signal.

6. A unitary interconnection device according to claim 5 wherein said connectors include DB-25 type connectors and said diode-capacitor network includes a multiplicity of diodes having one terminal thereof connected to pins 4, 5, 6, 8 and 20 of each of said connectors, said diode-capacitor network including a capacitor having one terminal thereof connected to the other terminals of said diodes and the other terminal thereof connected to pin 7 of each of said connectors, said active signal circuit including a CMOS astable multivibrator controlling bipolar transistor drivers connected through capacitor means to pins 15 and 17 of said connectors.

7. A unitary interconnection device according to claim 6 wherein said last named capacitor means includes a pair of capacitors having one terminal thereof connected to a common point in the circuit of said bipolar transistors with one of said capacitors having its other terminal connected to pin 15 of said connectors and the other of said capacitors having its other terminal connected to pin 17 of said connectors.

* * * * *